(12) United States Patent
Mahalingam

(10) Patent No.: US 9,424,208 B2
(45) Date of Patent: Aug. 23, 2016

(54) SYSTEM FOR CONTROLLING ASSOCIATION OF MICROPHONE AND SPEAKERS

(71) Applicant: Padmanabhan Mahalingam, Madras (IN)

(72) Inventor: Padmanabhan Mahalingam, Madras (IN)

(*) Notice: Subject to any disclaimer, the term of this patent is extended or adjusted under 35 U.S.C. 154(b) by 375 days.

(21) Appl. No.: 13/724,528

(22) Filed: Dec. 21, 2012

(65) Prior Publication Data

US 2013/0283164 A1  Oct. 24, 2013

Related U.S. Application Data

(60) Provisional application No. 61/636,094, filed on Apr. 20, 2012.

(51) Int. Cl.
*G06F 13/12* (2006.01)
*G06F 3/0481* (2013.01)
*G06F 3/0486* (2013.01)
*G06F 3/16* (2006.01)

(52) U.S. Cl.
CPC .............. *G06F 13/12* (2013.01); *G06F 3/0486* (2013.01); *G06F 3/04817* (2013.01); *G06F 3/165* (2013.01)

(58) Field of Classification Search
USPC ........................................... 715/727; 710/64
See application file for complete search history.

(56) References Cited

U.S. PATENT DOCUMENTS 5,390,138 A * 2/1995 Milne et al. ................... 381/119
2002/0196134 A1* 12/2002 Lutter et al. ................... 340/426
2010/0251124 A1* 9/2010 Geppert et al. ............... 715/734

OTHER PUBLICATIONS

Wiley—Fedora and Red Hat Linus Bible—PulseAudio—copyright 2009.pdf.*
TechWorld—Pulse Audio—Lennart Poettering—Oct. 2009.pdf.*
QjackCtl and the PatchBay—rncbc.org—Mar. 2008.pdf.*
PulseAudio Web Site—Apr. 19, 2011.pdf.*
What is JACK—Mar. 2011.pdf.*
Palm Pre Data Sheet—Mar. 2011.pdf.*
Demystifying Device Setup.*
W730-M—Wireless Headset for Lync.*
Lync for iPhone and iPad Requirements.*
Microsoft_Lync_2010_Voice_and_Video_Training_RTM.*

* cited by examiner

*Primary Examiner* — Peiyong Weng
(74) *Attorney, Agent, or Firm* — Donald R. Boys; Central Coast Patent Agency Inc.

(57) ABSTRACT

A method includes steps determining individual ones of speakers and microphones connected to a first computerized appliance by execution of a software routine, determining individual ones of computer applications executable on the first or a second computerized appliance, and capable of audio input and output, and associating the speakers and microphones with the computer applications such that audio output from individual applications is provided to associated speakers only and audio input from individual microphones is provided to associated applications only.

16 Claims, 6 Drawing Sheets

SYSTEM FOR CONTROLLING ASSOCIATION OF MICROPHONE AND SPEAKERS

CROSS-REFERENCE TO RELATED APPLICATIONS

This application claims priority to Provisional Application Ser. No. 61/636,094 filed Apr. 20, 2012, which is incorporated in this application in its entirety at least by reference.

BACKGROUND OF THE INVENTION

1. Field of the Invention

The present invention is in the technical area of operation of computerized appliances.

2. Description of Related Art

A personal or networked computer can have multiple applications running simultaneously that require audio input or output, as well as any number of devices, such as headsets, speakers, and microphones, which will associate with those applications. Currently, there is no simple way to choose which application executing on a computer with which a connected audio device might associate. Typically a user must access a configuration utility or input for each application executing, and choose to mute or unmute audio input and/or output.

BRIEF SUMMARY OF THE INVENTION

In an embodiment of the present invention a method is provided, comprising determining individual ones of speakers and microphones connected to a first computerized appliance by execution of a software routine, determining individual ones of computer applications executable on the first or a second computerized appliance, and capable of audio input and output, and associating the speakers and microphones with the computer applications such that audio output from individual applications is provided to associated speakers only and audio input from individual microphones is provided to associated applications only.

In one embodiment of the invention the method includes providing by the software routine an interactive interface on a display of the computerized appliance, the interactive interface enabling a user to specify association of speakers and microphones with individual ones of the individual applications. Also in one embodiment the method includes displaying in the interactive interface names or icons or both depicting individual ones of the individual applications, and identity of speakers and microphones associated with each application proximal to the names or icons depicting the applications.

In some embodiments of the invention the method comprises enabling by the software routine one or both of drag-and-drop and copy-and-paste for the user to move identity of a speaker or a microphone from one proximal location to another, changing by the movement association of the moved speaker or microphone with the application. Also in some embodiments the method comprises indicating association by change in font characteristic or color.

In some embodiment the method comprises performing the steps on a smartphone as a computerized appliance. In some other embodiments performing the steps on a pad device as a computerized appliance. Instill other embodiments the method comprises the computer applications and software routine executing on the second computerized appliance operating as an interconnected server, with the speakers and microphones connected to first computerized appliances connected by network to the first computerized appliance.

In another aspect of the invention an apparatus is provided, comprising a processor and a memory, the memory storing instructions that when executed by the processor, cause the processor to determine individual ones of speakers and microphones connected to a first computerized appliance by execution of a software routine, determine individual ones of computer applications executable on the first or a second computerized appliance, and capable of audio input and output, and associate the speakers and microphones with the computer applications such that audio output from individual applications is provided to associated speakers only and audio input from individual microphones is provided to associated applications only.

In one embodiment the apparatus comprises providing by the software routine an interactive interface on a display of the computerized appliance, the interactive interface enabling a user to specify association of speakers and microphones with individual ones of the individual applications. In another embodiment the apparatus comprises displaying in the interactive interface names or icons or both depicting individual ones of the individual applications, and identity of speakers and microphones associated with each application proximal to the names or icons depicting the applications.

In some other embodiments the apparatus comprises enabling by the software routine one or both of drag-and-drop and copy-and-paste for the user to move identity of a speaker or a microphone from one proximal location to another, changing by the movement association of the moved speaker or microphone with the application. Also in some embodiments the apparatus comprises indicating association by change in font characteristic or color.

In some further embodiments the apparatus comprises performing the steps on a smartphone as a computerized appliance, or performing the steps on a pad device as a computerized appliance.

In some embodiments the apparatus comprises the computer applications and software routine executing on the second computerized appliance operating as an interconnected server, with the speakers and microphones connected to first computerized appliances connected by network to the first computerized appliance.

DETAILED DESCRIPTION OF THE INVENTION

The inventor provides a system and method for associating any computer-compatible audio device with any active computer applications that may require audio. The system and methods of the invention are described below according to the following embodiments.

Figure 1:
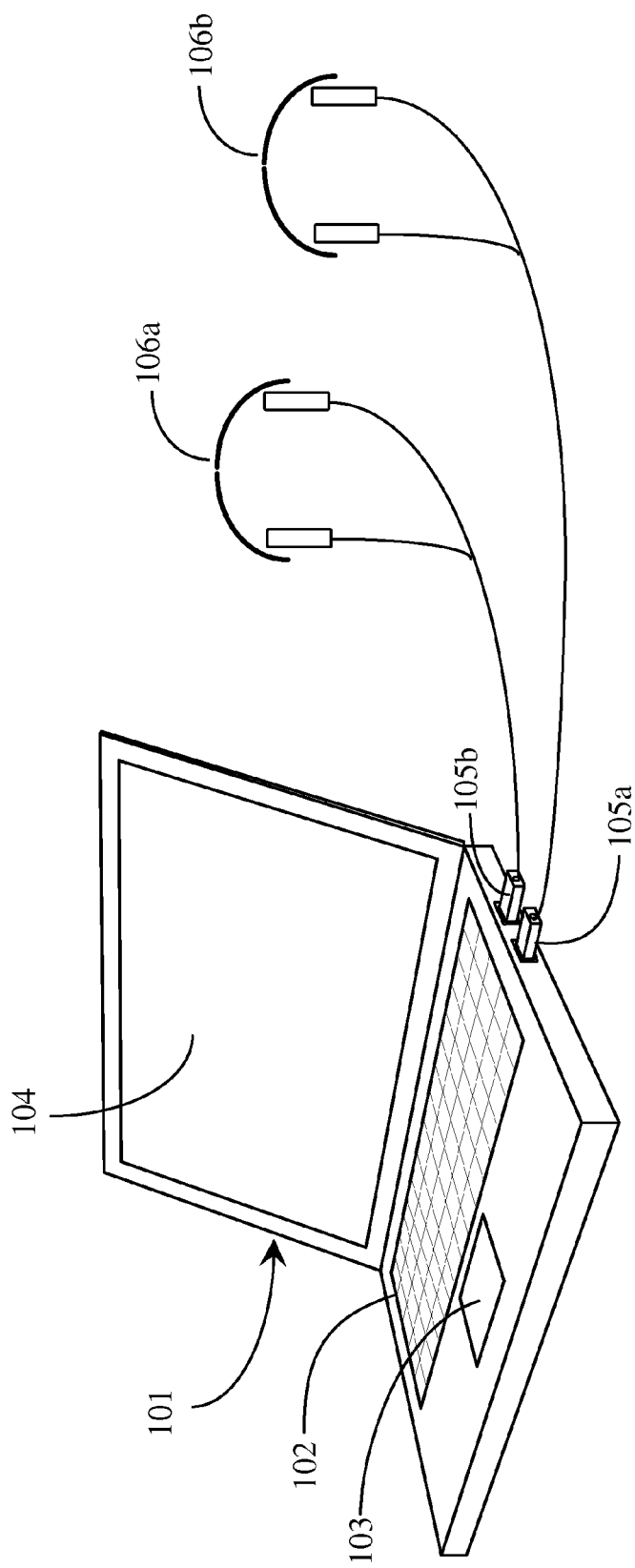
FIG. 1 illustrates a laptop computer with a standard keyboard and track pad, two USB inputs, and two sets of headphones.

As shown in FIG. 1, a computerized appliance, such as a laptop personal computer 101, having in this case a display 104, a keyboard 102 and a mouse pad 103 may have multiple USB ports 105a, 105b into which any number of audio devices may be connected to internal elements of the computer. In the example shown in FIG. 1, two sets of headphones 106a, 106b are plugged into the USB ports. The laptop computer illustrated in FIG. 1 is simply exemplary of computerized appliances in general, and the invention is operable with any sort of computerized appliance that may execute applications that require audio input and/or output, such as softphones, for example.

Figure 2:
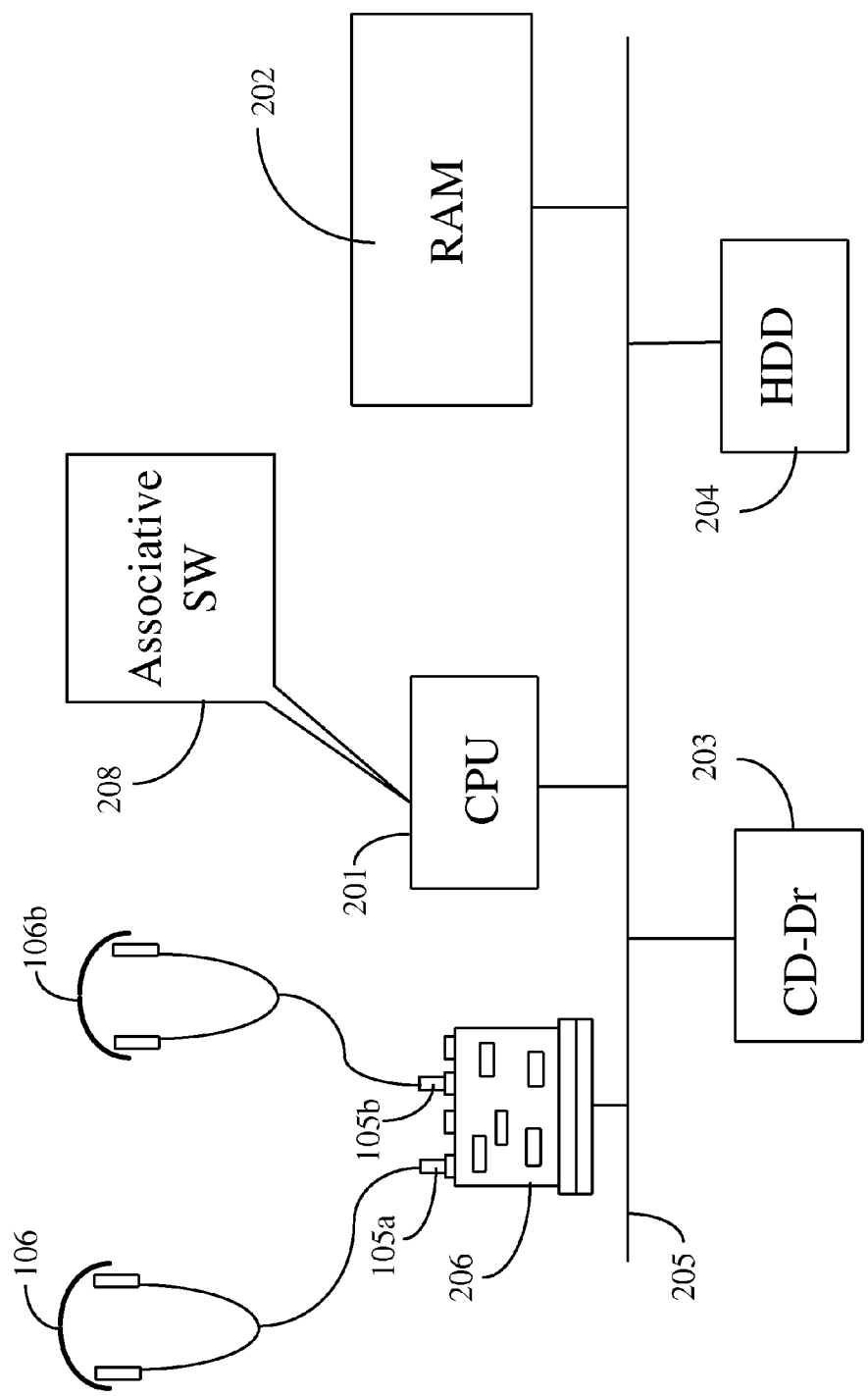
FIG. 2 illustrates elements within the laptop computer of FIG. 1.

FIG. 2 illustrates internal components of laptop computer 101 of FIG. 1 in a general way. In this example an internal bus is represented by path 205, which is meant to represent any bus connectivity between elements of the computer. A CPU 201 is connected to the internal bus, and is shown executing associative software 208. A USB card 206 connects to bus 205 and provides ports 105a and 105b to which headphones 106a and 106b are connected, such that input and output may be communicated to and from elements in the computer. There is also illustrated Random Access Memory 202, a Hard Disk Drive 204 and a CD drive 203, all interconnected by bus 205.

An important aspect of the invention is associative software 208 that operates in the background, and enables a user to associate connected audio devices, such as headphones 106a and 106b shown in FIG. 1, with applications that may execute on the computerized appliance and require interaction with the audio devices. The associative software may deal with any application, as well as any device, that requires audio input and/or output. This may include live communication applications such as Skype, Google Talk, any video/audio conferencing applications, and any online applications that involve audio, and the like. This also includes devices such as headsets, headphones, microphones, recorders, and so forth.

When a user has an audio device, such as a headset, plugged into a computer that may be running multiple applications dealing with audio, the computer in current art does not associate audio input or output from a connected audio device with just one active application, but instead will associate the audio device with all active applications. Say, for example, a user is participating in a video conference call over Skype, and is also viewing a video webinar on the Internet. The audio from both active applications will come through the headset. To resolve this issue, the user must navigate to each individual application to either close it, or mute the sound function of one application or the other.

Figure 3:
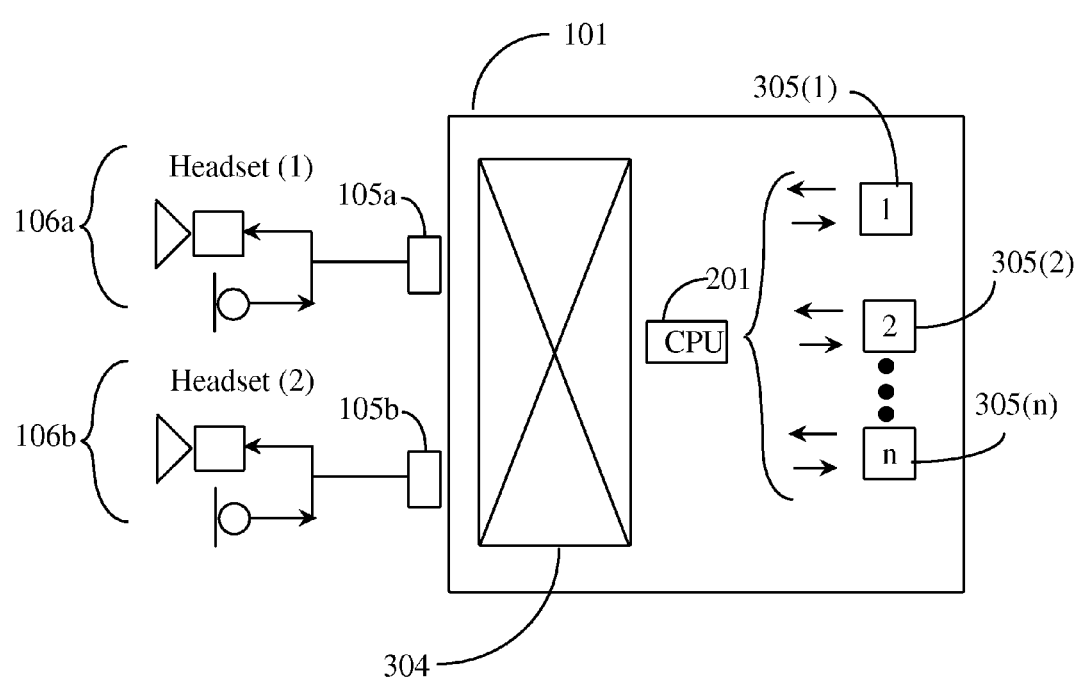
FIG. 3 illustrates a computer with multiple running applications and two headsets with both audio input and output.

FIG. 3 illustrates computer 101 with headsets 106a and 106b connected a virtual switching element 304, CPU 201 and active applications 305(1), 305(2) through 305(n). Virtual switching element 304 is created by the associative software 208 of FIG. 2 as a softswitch enabling a user to associate the headsets with individual ones of the active applications.

Figure 4:
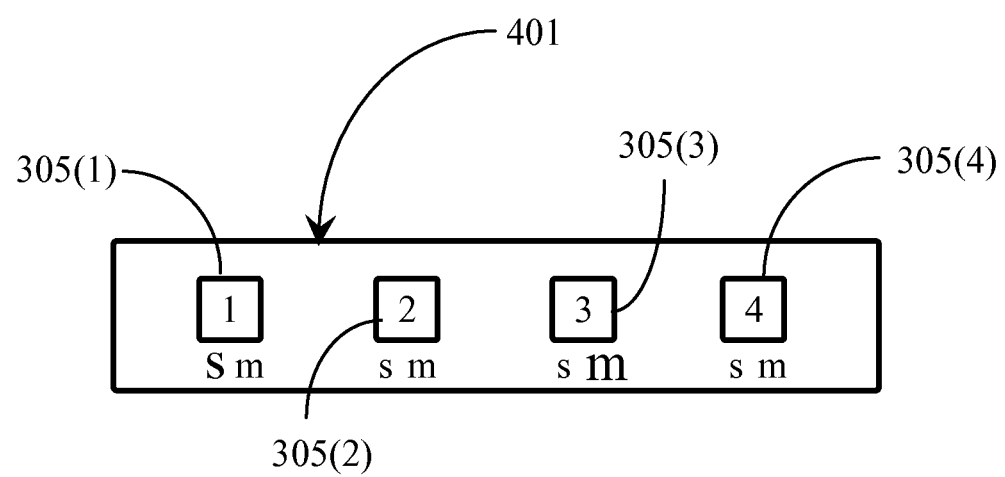
FIG. 4 illustrates an interactive dialogue box with four applications running, and an "s" and "m" under each applications 1-4, indicating speaker and microphone.

The associative software in an embodiment of the present invention enables a user to easily toggle between active applications through the use of a pop-up dialogue box provided by the associative software on display 104 of computer 101. FIG. 4 illustrates a simple associative display 401 in which four active application 305(1) through 305(4) are executing. This associative interactive window assumes just one headphone or speaker/microphone set is connected and operative. An indication of the speaker (s) and the microphone (m) is provided just below the indication of each one of the active applications that may require audio input or output. In this example the indications s and m are interactive and operated as toggles. Note that the s under application 305(1) is a larger font and bold compared to the s under application 305(2). This is because the user has clicked on the speaker indication for application 305(1) to associate the one speaker with that application. The user may dis-associate the speaker with that application by one again clicking on the speaker indicator, in which case the font will revert to the smaller, not-bold font. These indications could be by color, or by other indication of on-off as well. Note that the microphone is active for application 305(3). When the associative software is running, the selection window is displayed or accessible to be displayed. Window is managed by the associative software such that a user may toggle the association for the speaker and/or the microphone on and off for each running application. The user may select to have the microphone provide input to two of the four applications, and may enable the speaker to listen to just one other application. The selection is not mutually exclusive, and the user may associate with just one or any combination.

Figure 5:
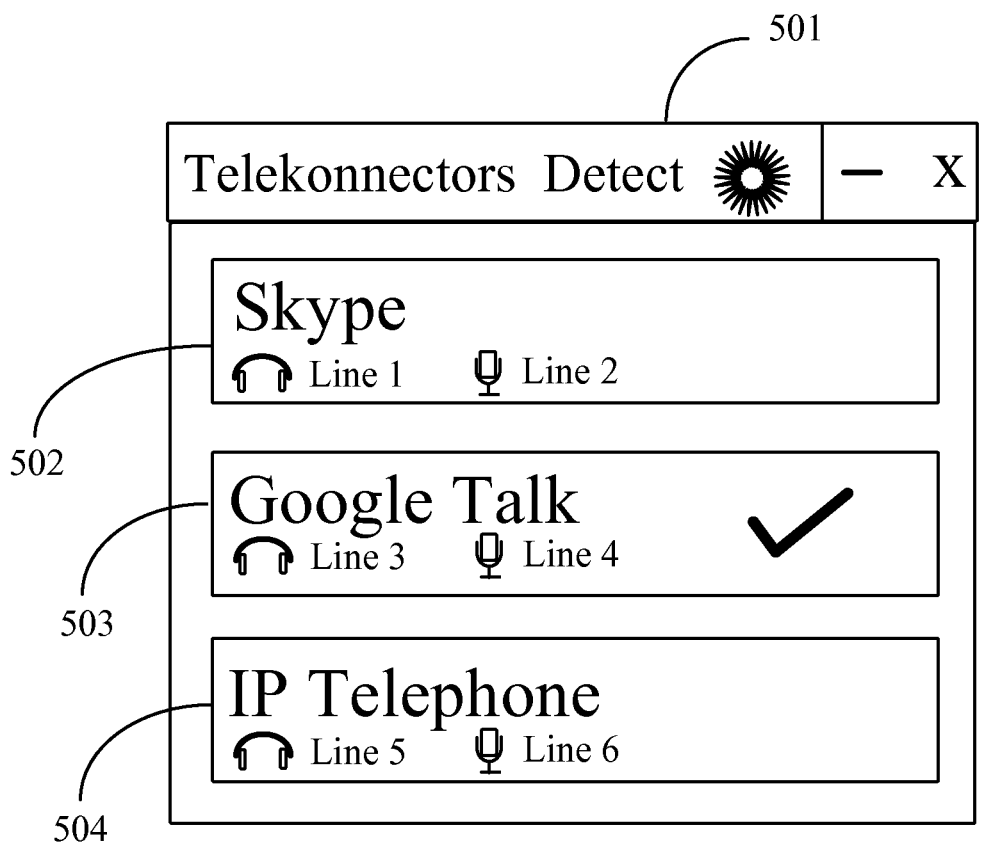
FIG. 5 illustrates an interactive dialogue box.

FIG. 5 illustrates a somewhat more advanced interactive window 501 that may be displayed on display 104 for a user to associate audio I/O devices with active applications. The associative software in an embodiment of the invention, once installed, may be started by a user, or may operate in the background and boot when the computer is booted. There are many possibilities. The association aspect is accomplished by associative software 208 executing from a non-transitory physical medium on the computerized appliance. This unique application can boot with the appliance, can be started by a user, or in some embodiments may be a part of the operating system of the appliance, and when running may present a selection mechanism such as window 501 as an interactive interface on a display 104 driven by the appliance. Pop-up dialogue box (501) can be closed or minimized like any other window, and shows the various applications running on the computer (101) that require audio. This is accomplished by the associative software regularly scanning for active applications that require audio I/O. In some embodiments the associative software operates with stored data and associative tables that the software may access to provide icons and the like for display. In this example, the programs active are Skype (502), Google Talk (503), and an IP softphone (504), each having a microphone icon, representing audio output, and a headset icon, representing audio input. In this example there are three sets of speaker/microphone combinations, and each has been assigned a line number. Lines 1 and 2 are one set, lines 3 and 4 a second set, and lines 5 and 6 a third set. The first set is currently associated with Skype, the second set with Google Talk and the third set with the IP softphone. The checkmark indicates that Google talk is executing, so actual audio from the second set is active with Google Talk.

The interactivity in this example is such that a user may drag and drop line indicators between applications, or may copy and paste, in which case the associative software will make the new associations and indications. The user also has ability to mute or unmute any line.

As in the previous example, if the user is running both Skype and a webinar on the Internet, they may wish to have only audio input from the webinar and both audio input and output in Skype. In this case, the user would initiate the associative software, and drag the headphone icon (line 1) to the Skype box and the microphone icon (line 2) to the same box using the drag-and-drop selection mechanism in the pop-up dialogue box (501).

In another case, two headsets may be plugged into one computer that is being used to conduct an online webinar. If one user is to have the ability to both send and receive audio through a headset or combination of headphones and an microphone, while the other is to only have the ability to receive audio through their headphones, the first user would associate their headphone and microphone icons to the active application, and assign just the headphone icon for the second user.

Figure 6:
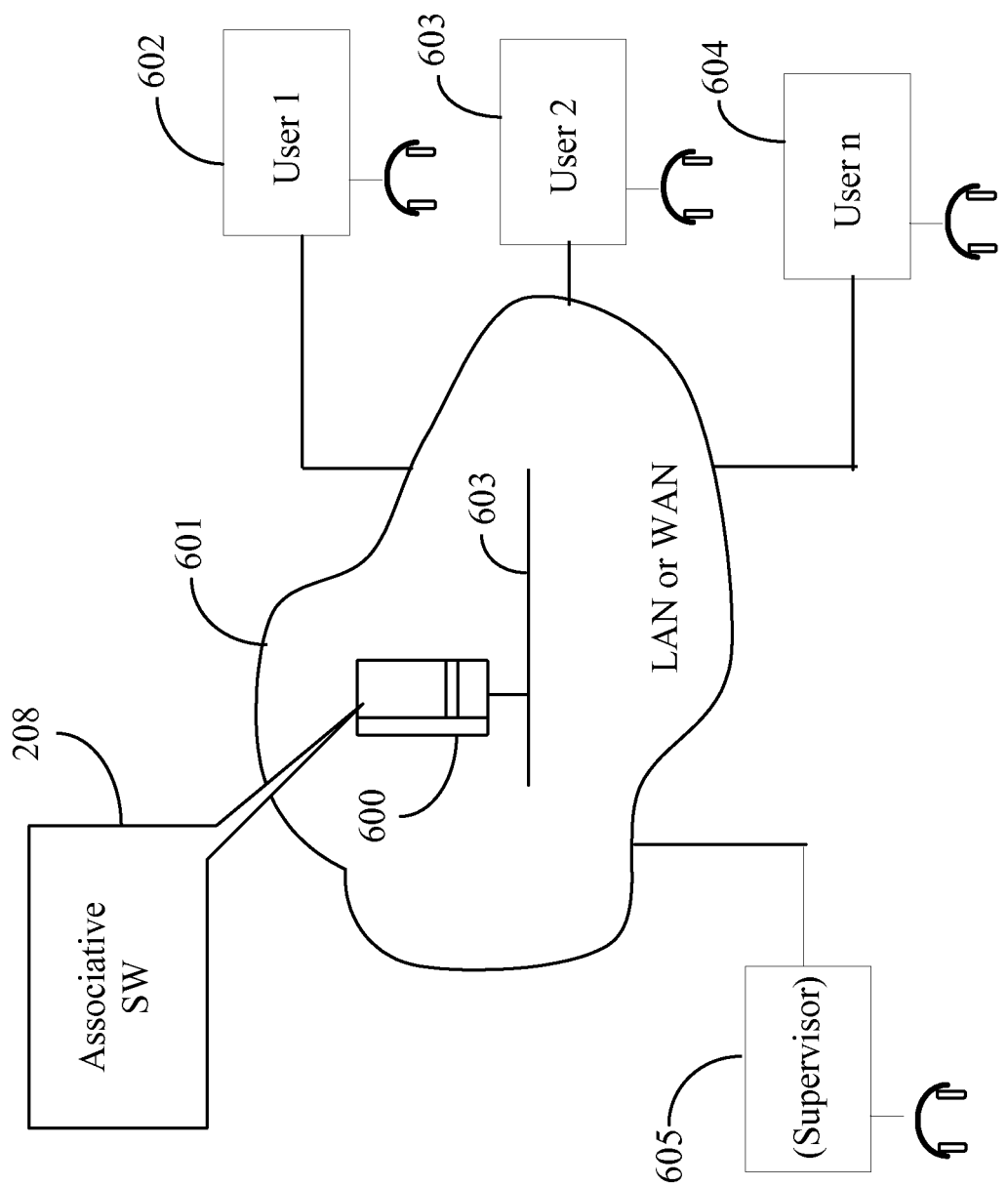
FIG. 6 illustrates a Local Area Network (LAN) or Wide Area Network (WAN) that provides Internet to any number of computers, and runs associative software.

In certain cases, such as in a contact center, where multiple computers are connected through a Local Area Network (LAN) or a Wide Area Network (WAN) (601) as in FIG. 6, where all connected computers have access to the Internet and any applications that require audio, a supervisor (605) might manage the associative software executing on a server 600 through a dialogue box similar to that illustrates in FIG. 5. This would allow the supervisor to associate devices connecting through anyone of the networked computers (602, 603, 604) to anyone of possible executing applications in the contact center, for example. This would, of course, include the supervisor's own headset.

It is noted that the present invention in numerous embodiments is not limited to laptop computers or desktop computers, but may be practiced using any sort of computerized appliance to which speakers and microphones are native or to which such audio devices may be connected, including pad devices and smartphones.

It will be apparent to the skilled person that the functionality in embodiments described herein may be provided in a variety of ways which are not outside the scope of the invention. Interactive displays, for example, may be provided in a variety of formats and with a variety of functionality. The associative software may be coded in a wide variety of ways, as is true for essentially any software. The software may be a part of an operating system or separate. The software may boot when the associated appliance boots, or may require user intervention. In some case associations may be pre-configured and be activated, but be subject to user intervention to change the configuration. The scope of the invention is limited only by the claims that follow.

The invention claimed is:

1. A method, comprising:
    determining individual ones of speakers and microphones connected to a first computerized appliance by execution of a software routine;
    determining individual ones of computer applications, third party to the software routine, installed in memory and executable on the first computerized appliance and determining applications, third party to the software routine, installed and executing from a second computerized device connected to the first computerized device, said applications capable of audio input and output;
    providing by the software routine an interactive interface on a display of the computerized appliance, the interactive interface enabling a user to specify association of individual ones of the speakers and microphones as a set; and
    associating at least one each of the sets with each of the computer applications such that the audio output and audio input of the sets are provided to associated applications only.

2. The method of claim 1 further comprising:
    providing by the software routine a softswitch in the display of the computerized appliance, the softswitch enabling a user to specify association of sets with individual ones of the individual applications.

3. The method of claim 2 further comprising:
    displaying in the interactive interface names or icons or both depicting individual ones of the individual applications, and identity of sets associated with each application proximal to the names or icons depicting the applications.

4. The method of claim 3 further comprising:
    enabling by the software routine one or both of drag-and-drop and copy-and-paste for the user to move identity of a speaker and microphone set from one proximal location to another, changing by the movement association of the set with the application.

5. The method of claim 4 further comprising:
    indicating association by change in font characteristic or color.

6. The method of claim 1 further comprising:
    performing the steps on a smartphone as a computerized appliance.

7. The method of claim 1 further comprising:
    performing the steps on a pad device as a computerized appliance.

8. The method of claim 1 further comprising:
    the computer applications and software routine executing on the second computerized appliance operating as an interconnected server, with the speakers and microphones connected to first computerized appliances connected by network to the first computerized appliance.

9. An apparatus, comprising:
    a processor and a memory, the memory storing a software routine that when executed by the processor, cause the processor to:
    determine individual ones of speakers and microphones connected to a first computerized appliance;
    determine any individual ones of computer applications, third party to the software routine, executable on the first computerized appliance or a second computerized appliance connected to the first computerized appliance, and capable of audio input and output;
    providing by the software routine an interactive interface on a display of the computerized appliance, the interactive interface enabling a user to specify association of speakers and microphones into sets and associate at least one of the sets with individual ones of the individual applications;
    wherein audio output from the individual applications is provided to associated speakers of the at least one of the sets only and audio input from individual microphones of the at least one of the sets is provided to associated applications only.

10. The apparatus of claim 9 further comprising:
    providing by the software routine a softswitch in the interactive interface, the softswitch enabling a user to toggle between at least one of the sets and individual ones of the individual applications.

11. The apparatus of claim 10 further comprising:
    displaying in the interactive interface names or icons or both depicting individual ones of the individual applications, and identity of the sets associated with each application proximal to the names or icons depicting the applications.

12. The apparatus of claim 11 further comprising:
    enabling by the software routine one or both of drag-and-drop and copy-and-paste for the user to move identity of at least one of the sets from one proximal location to another, changing by the movement association of the at least one set with the application.

13. The apparatus of claim 12 further comprising:
indicating association by change in font characteristic or color.

14. The apparatus of claim 9 further comprising:
performing the steps on a smartphone as a computerized appliance.

15. The apparatus of claim 9 further comprising:
performing the steps on a pad device as a computerized appliance.

16. The apparatus of claim 9 further comprising:
the computer applications and software routine executing on the second computerized appliance operating as an interconnected server, with the speakers and microphones connected to first computerized appliances connected by network to the first computerized appliance.

* * * * *